US009362859B2

(12) United States Patent
Wagoner et al.

(10) Patent No.: US 9,362,859 B2
(45) Date of Patent: Jun. 7, 2016

(54) SYSTEM AND METHOD FOR CONTROLLING SWITCHING ELEMENTS WITHIN A SINGLE-PHASE BRIDGE CIRCUIT

(71) Applicant: General Electric Company, Schenectady, NY (US)

(72) Inventors: Robert Gregory Wagoner, Roanoke, VA (US); Anthony Michael Klodowski, Hardy, VA (US); Todd David Greenleaf, Salem, VA (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 14/036,039

(22) Filed: Sep. 25, 2013

(65) Prior Publication Data

US 2015/0084337 A1    Mar. 26, 2015

(51) Int. Cl.
*H02M 5/45* (2006.01)
*H02P 9/00* (2006.01)
(Continued)

(52) U.S. Cl.
CPC .................. *H02P 9/007* (2013.01); *H02M 1/38* (2013.01); *H02M 5/4585* (2013.01); *H02M 7/5387* (2013.01); *H02M 2001/385* (2013.01); *H02P 2101/15* (2015.01)

(58) Field of Classification Search
CPC . H02M 5/458; H02M 3/3376; H02M 7/5387; H02M 1/38; H02M 2001/385; H02M 5/4585; H02P 9/007; H02P 2009/004; H02P 2101/15
USPC ............ 363/16, 17, 34, 35, 37, 56.02, 58, 89, 363/98, 125, 127, 132, 136; 290/43, 44, 55
See application file for complete search history.

(56) References Cited

U.S. PATENT DOCUMENTS 4,546,422 A * 10/1985 Okado .................. H02M 7/537
                                                318/811
4,910,416 A    3/1990  Salcone
(Continued)

FOREIGN PATENT DOCUMENTS

DE           4032014       10/1990
DE        102009030740     12/2010
EP           2317134        5/2011

OTHER PUBLICATIONS

Related U.S. Appl. No. 13/744,948, filed Jan. 18, 2013.
(Continued)

*Primary Examiner* — Adolf Berhane
*Assistant Examiner* — Alex Torres-Rivera
(74) *Attorney, Agent, or Firm* — Dority & Manning, P.A.

(57) ABSTRACT

In one aspect, a method for controlling the operation of switching elements contained within a single-phase bridge circuit of a power convertor may include monitoring gate voltages of a first switching element and a second switching element of the single-phase bridge circuit and controlling the first and second switching elements so that each switching element is alternated between an activated state and a deactivated state. In addition, the method may include transmitting a gating command signal to adjust the first switching element from the deactivated state to the activated state when: a first gate drive command is received that is associated with switching the first switching element to the activated state; a second gate drive command is received that is associated with switching the second switching element to the deactivated state; and the gate voltage of the second switching element is less than a predetermined voltage threshold.

9 Claims, 8 Drawing Sheets

(51) Int. Cl.
*H02M 1/38* (2007.01)
*H02M 5/458* (2006.01)
*H02M 7/5387* (2007.01)
*H02P 101/15* (2015.01)

(56) References Cited

U.S. PATENT DOCUMENTS

| | | | |
|---|---|---|---|
| 5,070,440 | A | 12/1991 | Walker |
| 5,083,039 | A * | 1/1992 | Richardson ........... F03D 7/0272 290/44 |
| 5,408,150 | A * | 4/1995 | Wilcox ......................... 327/108 |
| 6,069,809 | A * | 5/2000 | Inoshita ........................ 363/98 |
| 6,545,450 | B1 | 4/2003 | Ledenev et al. |
| 6,751,105 | B2 | 6/2004 | Yamanaka et al. |
| 6,751,106 | B2 | 6/2004 | Zhang et al. |
| 7,446,435 | B2 | 11/2008 | Zhang et al. |
| 7,643,318 | B2 | 1/2010 | Wagoner |
| 7,876,191 | B2 | 1/2011 | Chandrasekaran et al. |
| 7,928,592 | B2 | 4/2011 | Wagoner et al. |
| 7,939,959 | B2 | 5/2011 | Wagoner et al. |
| 7,944,068 | B2 | 5/2011 | Wagoner et al. |
| 8,138,620 | B2 | 3/2012 | Wagoner et al. |
| 8,270,191 | B2 | 9/2012 | Zhu et al. |
| 8,310,074 | B2 | 11/2012 | Larsen et al. |
| 2002/0172062 | A1 * | 11/2002 | Furukawa ........... B60L 11/1803 363/132 |
| 2003/0107905 | A1 * | 6/2003 | Miura et al. .................... 363/41 |
| 2004/0233690 | A1 | 11/2004 | Ledenev et al. |
| 2007/0121354 | A1 * | 5/2007 | Jones .................. H02M 5/4585 363/47 |
| 2008/0054874 | A1 | 3/2008 | Chandrasekaran et al. |
| 2009/0206606 | A1 * | 8/2009 | Jorgensen ............. F03D 7/0224 290/44 |
| 2010/0109328 | A1 * | 5/2010 | Li et al. .......................... 290/44 |
| 2010/0254168 | A1 | 10/2010 | Chandrasekaran |
| 2011/0101689 | A1 * | 5/2011 | Larsen et al. ................... 290/44 |
| 2011/0299311 | A1 | 12/2011 | Zhu et al. |
| 2013/0082741 | A1 * | 4/2013 | Domes .................. H03K 17/13 327/79 |

OTHER PUBLICATIONS

Related U.S. Appl. No. 13/744,975, filed Jan. 18, 2013.
Related U.S. Appl. No. 13/744,991, filed Jan. 18, 2013.
Related U.S. Appl. No. 13/904,342, filed May 29, 2013.
Related U.S. Appl. No. 13/871,309, filed Apr. 26, 2013.
European Search Report, Application No. 14185103.0, dated Feb. 9, 2016. (8 pages).

* cited by examiner ies, with the lockout time being defined as the amount of time or delay between when the controller sends a turn-off gating signal to one of the switching elements of a single-phase bridge circuit (e.g., the upper switching element) and when the controller sends a turn-on signal to the other switching element within the same single-phase bridge circuit (e.g., the lower switching element). Such lockout time prevents damage to the switching elements by ensuring that the switching elements are never activated or otherwise turned on at the same time.

SYSTEM AND METHOD FOR CONTROLLING SWITCHING ELEMENTS WITHIN A SINGLE-PHASE BRIDGE CIRCUIT

FIELD OF THE INVENTION

The present disclosure relates generally to power convertors for use within power generation systems, and more particularly, to a system and method for controlling switching elements within a single-phase bridge circuit of a power convertor.

BACKGROUND OF THE INVENTION

Power converters are used in renewable energy applications to convert electrical power generated by a renewable energy source into power that is suitable for supply to an AC grid. For example, power converters can be used in wind energy applications to convert the alternating current generated by a wind turbine to a desired output frequency (e.g. 50/60 Hz) and voltage level. Power converters can be used in solar energy applications to convert the DC power generated by one or more photovoltaic arrays into suitable AC power for the AC grid.

Power converters typically use a plurality of switching elements, such as insulated gate bipolar transistors (IGBTs), to convert power supplied from an input power source to a suitable output AC power for the AC grid. For instance, the power converters can include a plurality of single-phase bridge circuits, with each bride circuit including an upper switching element and a lower switching element coupled in series. An output of each single-phase bridge circuit can be coupled between the upper switching element and the lower switching element. Each bridge circuit may also include a diode coupled in parallel with each of the upper switching element and the lower switching element.

Existing control systems for power convertors are configured to implement a lockout time (also referred to as interlock time or dead time) when activating and deactivating switching elements, with the lockout time being defined as the amount of time or delay between when the controller sends a turn-off gating signal to one of the switching elements of a single-phase bridge circuit (e.g., the upper switching element) and when the controller sends a turn-on signal to the other switching element within the same single-phase bridge circuit (e.g., the lower switching element). Such lockout time prevents damage to the switching elements by ensuring that the switching elements are never activated or otherwise turned on at the same time.

Since the time required to turn on and/or off a switching element may vary significantly based on the operating conditions of the power convertor (e.g., voltage, current, temperature, etc.), it has been necessary in the past to configure the controller to provide a sufficient lockout time to ensure that there is no overlap in switching element conduction regardless of the operating conditions. Thus, a predetermined lockout time (i.e., a defined time period) is typically programmed into the controller that is sufficient to accommodate even the most extreme operating conditions. Unfortunately, given such required margins, predetermined lockout times are often too long, which can result in additional harmonics in the output waveform as well as an unnecessary delay in the control of the switching elements.

Thus, an improved system and method for controlling the activation and deactivation of switching elements contained within a single-phase bridge circuit of a power convertor would be welcomed in the technology.

BRIEF DESCRIPTION OF THE INVENTION

Aspects and advantages of the invention will be set forth in part in the following description, or may be obvious from the description, or may be learned through practice of the invention.

In one the present subject matter is directed to a method for controlling the operation of switching elements contained within a single-phase bridge circuit of a power convertor. The method may include monitoring, with a computing device, gate voltages of a first switching element and a second switching element of the single-phase bridge circuit and controlling the first and second switching elements so that each switching element is alternated between an activated state and a deactivated state. In addition, the method may include transmitting a gating command signal to adjust the first switching element from the deactivated state to the activated state when: a first gate drive command is received that is associated with switching the first switching element to the activated state; a second gate drive command is received that is associated with switching the second switching element to the deactivated state; and the gate voltage of the second switching element is less than a predetermined voltage threshold.

In another aspect, the present subject matter is directed to a method for controlling the operation of switching elements contained within a single-phase bridge circuit of a power convertor. The method may generally include controlling, with a computing device, operation of a first switching element and a second switching element of the single-phase bridge circuit so that each switching element is alternated between an activated state and a deactivated state, determining whether current is flowing into the first switching element or a first diode associated with the first switching element and maintaining the first switching element in the deactivated state when it is determined that current is flowing into the first diode.

In a further aspect, the present subject matter is directed to a wind turbine system for supplying power for application to a load. The system may generally include a wind turbine rotor and a generator coupled to the wind turbine rotor. In addition, the system may include a power convertor coupled to the generator and a controller communicatively coupled to the power convertor. The power convertor may include a single-phase bridge circuit having a first switching element and a second switching element. The controller may be configured to monitor gate voltages of the first and second switching elements and control the first and second switching elements so that each switching element is alternated between an activated state and a deactivated state. The controller may also be configured to transmit a gating command signal to adjust the first switching element from the deactivated state to the activated state when: a first gate drive command is received that is associated with switching the first switching element to the activated state; a second gate drive command is received that is associated with switching the second switching element to the deactivated state; and the gate voltage of the second switching element is less than a predetermined voltage threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
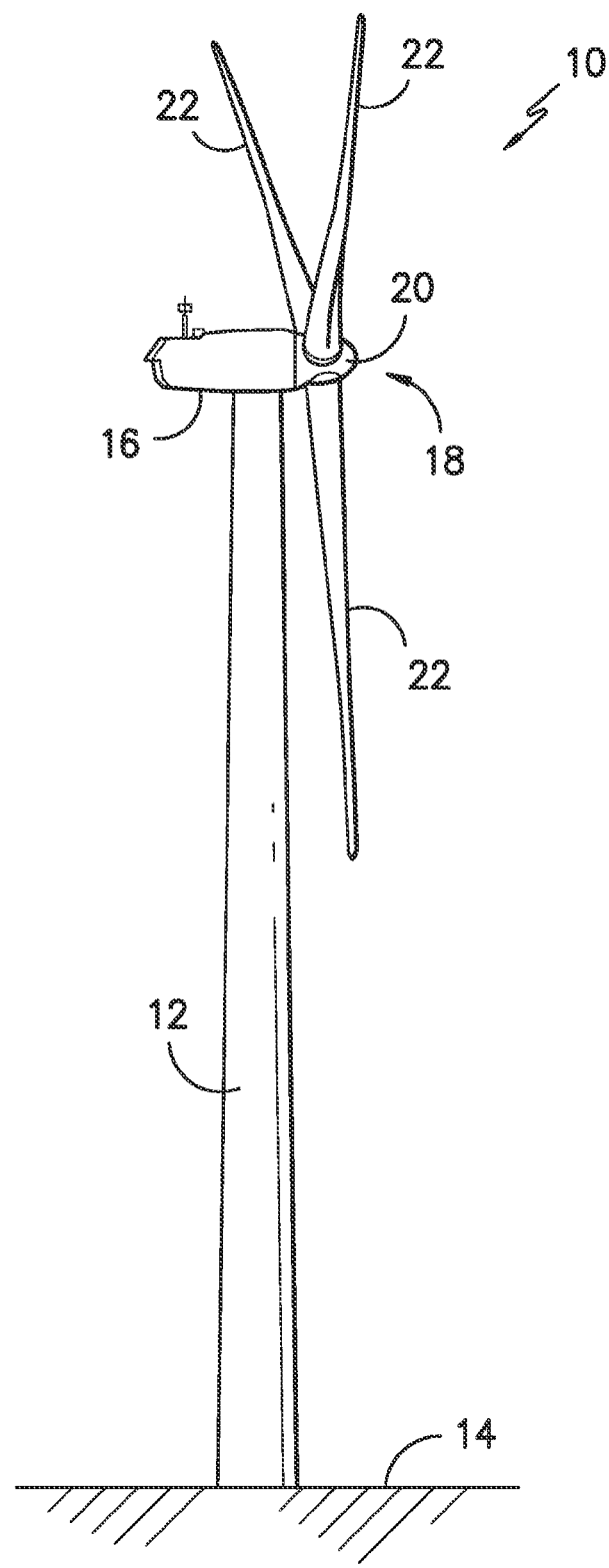
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the operation of switching elements contained within a single-phase bridge circuit of a power convertor. Specifically, in several embodiments, the switching elements may be alternatively switched between activated and deactivated states based on one or more monitored parameters that provide an indication of the current operating state of each switching element, such as the collector-emitter voltage of each switching element, the gate voltage of each switching element and/or the current direction relative to a diode of each switching element. By monitoring such parameter(s), a system controller may actively detect when one of the switching elements has been deactivated or switched off, thereby indicating that the other switching element may now be activated or switched on. As a result, the disclosed system and method may allow for lockout times to be minimized, which may result in lower harmonics and enhanced control of the switching elements.

It should be appreciated that, although the present subject matter will generally be described herein with respect to a DFIG wind turbine system, the disclosed system and method may generally be utilized within any suitable power generation system in order to advantageously control the operation of the switching elements contained within a power convertor of such system.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Figure 2:
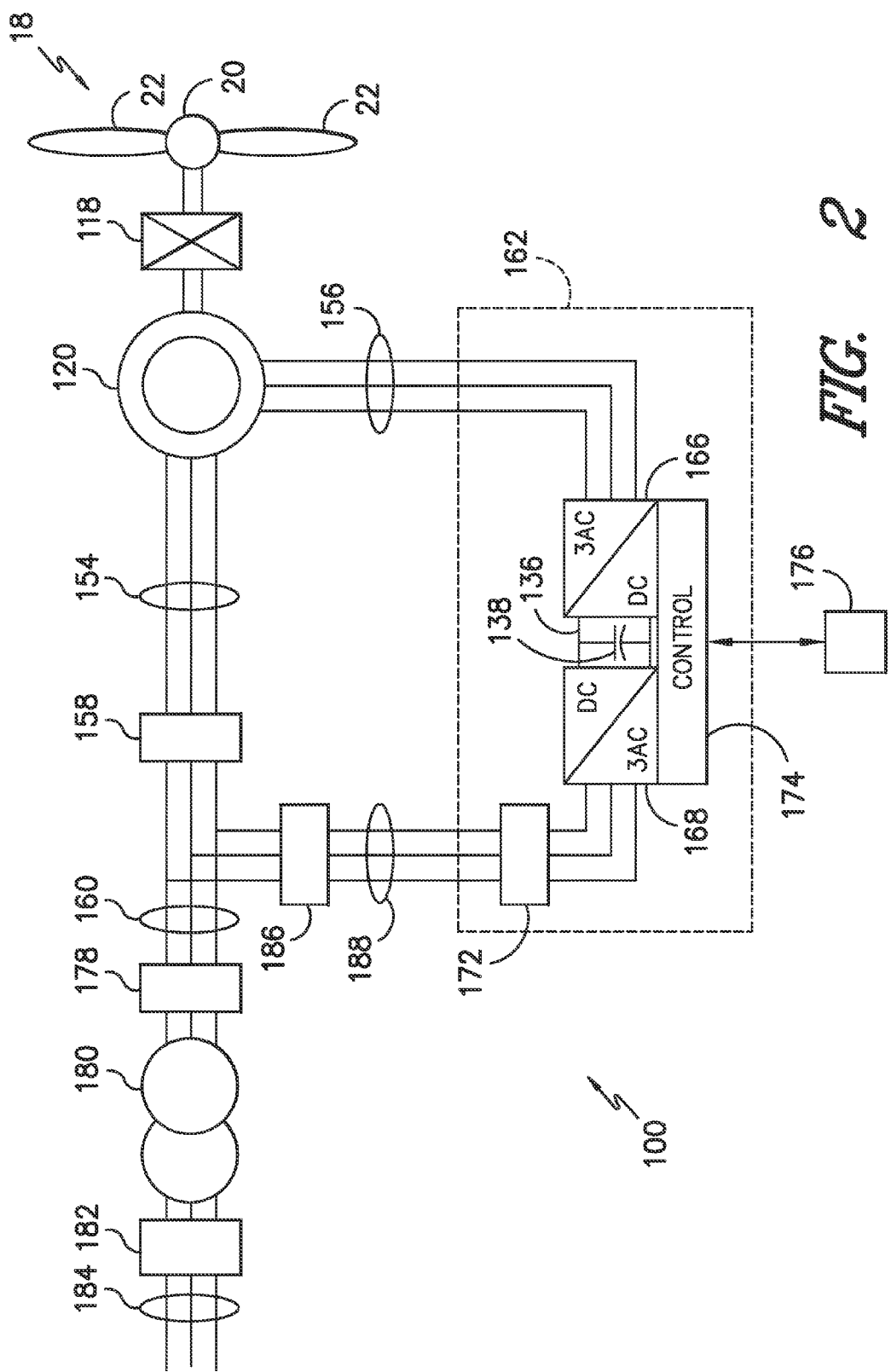
FIG. 2 illustrates a schematic view of one embodiment of a DFIG wind turbine system in accordance with aspects of the present subject matter.

Referring now to FIG. 2, a schematic diagram of one embodiment of a DFIG wind turbine system 100 is illustrated in accordance with aspects of the present subject matter. As shown, the rotor 18 of the wind turbine 10 may, optionally, be coupled to a gear box 118, which is, in turn, coupled to a generator 120. In accordance with aspects of the present disclosure, the generator 120 is a doubly fed induction generator (DFIG).

The DFIG. 120 may be coupled to a stator bus 154 and a power converter 162 via a rotor bus 156. The stator bus 154 may provide an output multiphase power (e.g. three-phase power) from a stator of the DFIG. 120 and the rotor bus 156 may provide an output multiphase power (e.g. three-phase power) from a rotor of the DFIG. 120. As shown in FIG. 2, the power converter 162 includes a rotor side converter 166 and a line side converter 168. The DFIG. 120 may be coupled via the rotor bus 156 to the rotor side converter 166. Additionally, the rotor side converter 166 may be coupled to the line side converter 168 which may, in turn, be coupled to a line side bus 188.

In several embodiments, the rotor side converter 166 and the line side converter 168 may be configured for normal operating mode in a three-phase, pulse width modulation (PWM) arrangement using suitable switching elements, such as insulated gate bipolar transistors (IGBTs), as will be discussed in more detail with respect to FIG. 3. The rotor side converter 166 and the line side converter 168 may be coupled via a DC link 136 across which is a DC link capacitor 138.

In addition, the power converter 162 may be coupled to a controller 174 in order to control the operation of the rotor side converter 166 and the line side converter 168. It should be noted that the controller 174 may be configured as an interface between the power converter 162 and any suitable control system 176. In general, the controller 174 may correspond to any suitable computing device and/or combination of computing devices. For instance, in several embodiments, the controller 174 may include one or more processor(s) and associated memory device(s configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 174 to perform various functions including, but not limited to, providing control commands (e.g. gating control commands) to the switching elements of the power converter 162.

In typical configurations, various line contactors and circuit breakers including, for example, a grid breaker 182 may also be included for isolating the various components as necessary for normal operation of the DFIG. 120 during connection to and disconnection from the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG. 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG. 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the control system 176 via the controller 174. The control signals may be based, among other things, on sensed conditions or operating characteristics of the wind turbine system 100. Typically, the control signals provide for control of the operation of the power converter 162. For example, feedback in the form of a sensed speed of the DFIG. 120 may be used to control the conversion of the output power from the rotor bus 156 to maintain a proper and balanced multi-phase (e.g. three-phase) power supply. In particular, the sensed speed may be used as a basis for adjusting the switching frequency of the switching elements. Additionally, feedback from other sensors may also be used by the controller 174 to control the power converter 162, including, for example, stator and rotor bus voltages, voltages associated with the switching elements and current feedbacks. Using the various forms of feedback information, switching control signals (e.g. gating control commands for the switching elements), stator synchronizing control signals, and circuit breaker signals may be generated.

Figure 3:
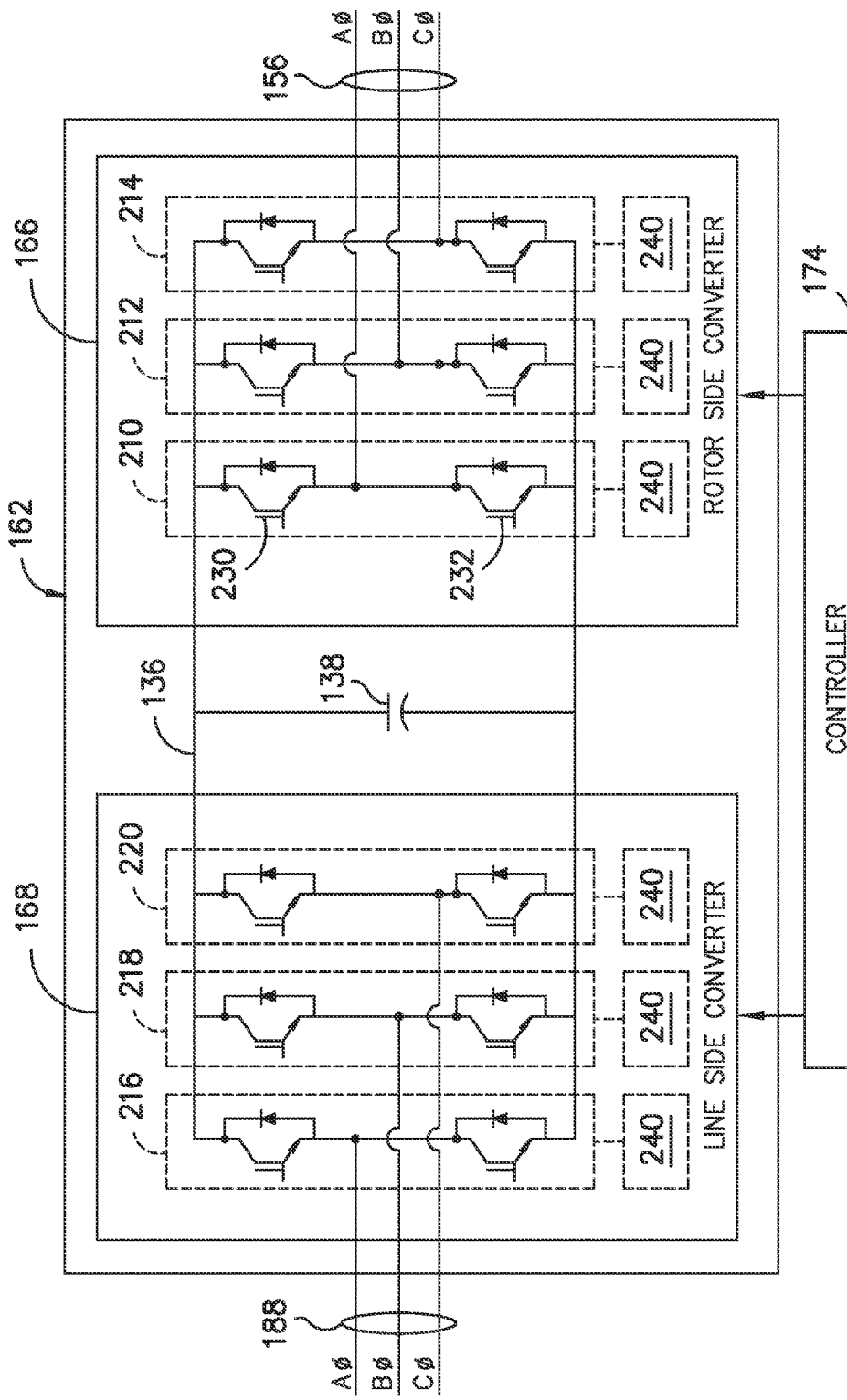
FIG. 3 illustrates a schematic view of one embodiment of the power convertor of the system shown in FIG. 2.

Referring now to FIG. 3, a schematic diagram of one embodiment of the power converter 162 shown in FIG. 2 is illustrated in accordance with aspects of the present subject matter. As shown, the rotor side converter 166 includes a plurality of rotor side bridge circuits 210, 212, 214 (e.g. H-bridge circuits), with each phase of the rotor bus 156 input to the rotor side converter 166 being coupled to a single rotor side bridge circuit 210, 212, 214. In addition, the line side converter 168 may also include a plurality of line side bridge circuits 216, 218, 220. Similar to the rotor side converter 166, the line side converter 168 also includes a single bridge circuit 216, 218, 220 for each output phase of the line converter 168. In other embodiments, the line side converter 168, the rotor side converter 166, or both the line side converter 168 and the rotor side converter 166 may include parallel bridge circuits without deviating from the scope of the present disclosure.

Each single-phase bridge circuit 210, 212, 214, 216, 218, 220 may generally include a plurality of switching elements (e.g. IGBTs) coupled in series with one another. For instance, as shown in FIG. 3, each bridge circuit includes an upper IGBT (e.g. IGBT 230) and a lower IGBT (e.g. IGBT 232). In addition, a diode (e.g., anti-parallel diodes 254, 256 (FIGS. 4 and 5)) may be associated with each of the IGBTs 230, 232. In alternative embodiments, parallel IGBTs and diodes may be used to increase the current rating of the converter. As is generally understood, the line side converter 168 and the rotor side converter 166 may be controlled, for instance, by providing control commands to one or more gate circuits 240 associated with the bridge circuits 210, 212, 214, 216, 218, 220. For example, the controller 174 may be configured to provide suitable gating control commands to the gate circuits 240, which may be used to activate and/or deactivate the IGBTs 230, 232 contained within each bridge circuit. It should be appreciated by those of ordinary skill in the art that, as an alternative to IGBTs, the power convertor 162 may include any other suitable switching elements.

Figure 4:
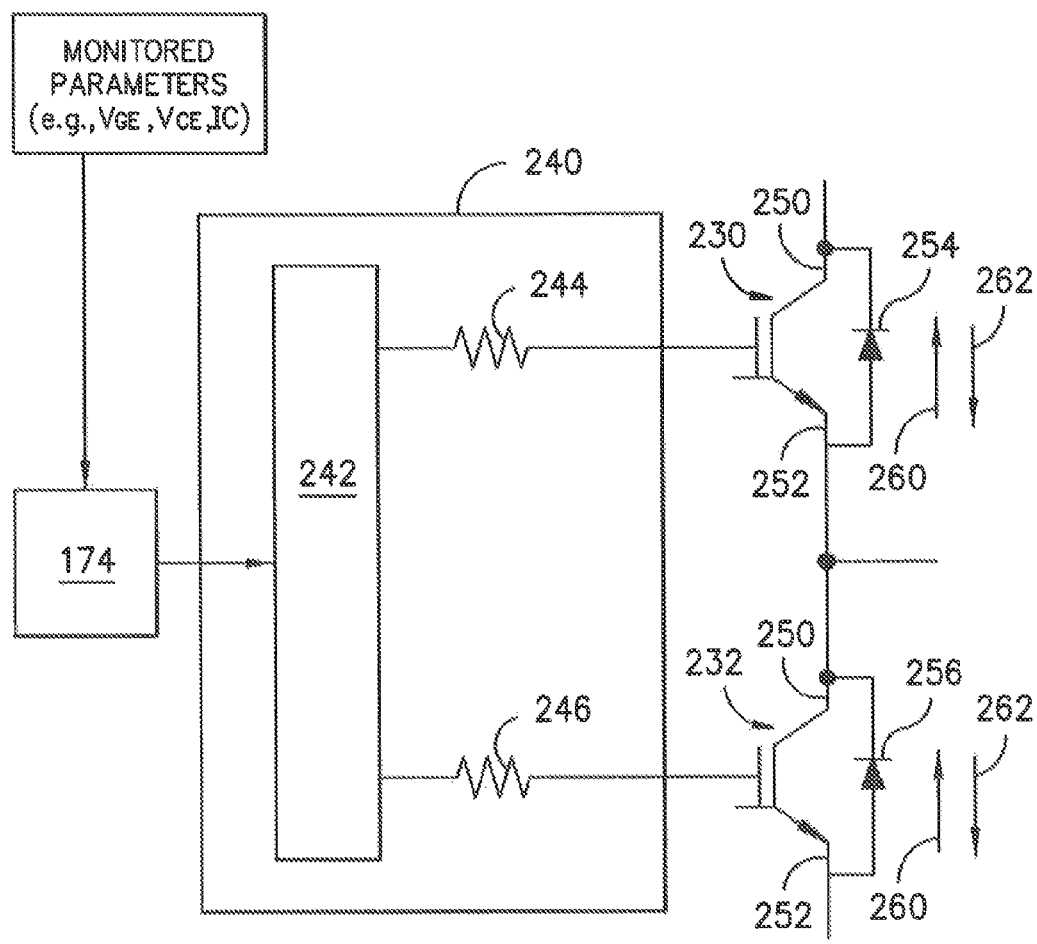
FIG. 4 illustrates a schematic view of one embodiment of a gate circuit suitable for controlling the switching elements of the power convertor shown in FIG. 3.

Referring now to FIG. 4, a schematic diagram of one embodiment of a gate circuit 240 that may be used control the operation of the switching elements (e.g., upper IGBT 230 and lower IGBT 232) of each single-phase bridge circuit 210, 212, 214, 216, 218, 220 is illustrated in accordance with aspects of the present subject matter. As shown, the gate circuit 240 includes a driver circuit 242 configured to control the switching of the upper IGBT 230 and the lower IGBT 232 pursuant to control commands received from the controller 174. For instance, the driver circuit 242 may include one or more electronic devices configured to generate a voltage signal suitable to switch the upper and lower IGBTs 230, 332 between activated and deactivated states. In addition, the gate circuit 240 may include a first gate resistor 244 coupled between the driver circuit 242 and the upper IGBT 230 and a second gate resistor 246 coupled between the driver circuit 242 and the lower IGBT 232.

During operation, the driver circuit 242 may be communicatively coupled to the controller 174 such that suitable control commands may be transmitted to the driver circuit 242 for alternately switching the IGBTs 230, 232. Specifically, the controller 174 may be configured to transmit gating control commands to the drive circuit 252 to alternate the upper and lower IGBTs 230, 232 between an activated state (i.e., ON) and a deactivated state (i.e., OFF). For example, assuming the lower IGBT 232 is currently ON or activated and the upper IGBT 230 is currently OFF or deactivated, the gating control commands may be transmitted in a manner that ensures that the lower IGBT 232 is turned OFF or deactivated prior to turning ON or activating the upper IGBT 230.

As indicated above, such control has typically been implemented using a predetermined delay period to ensure that a sufficient lockout time is provided to prevent overlap in conduction of the switching elements. However, since the delay period must be selected to account for variations in the operating conditions of the power convertor 162, the lockout time is typically excessive, which results in higher output harmonics and increased power losses. To minimize the lockout time, the present subject matter allows for activation and deactivation of the IGBTs to be controlled based on one or more monitored operating parameters. For instance, as will be described below, activation and deactivation of the IGBTs 230, 232 may be based on the gate voltage for each IGBT 230, 232 and/or the current direction relative to each IGBT 230, 232.

Figure 5:
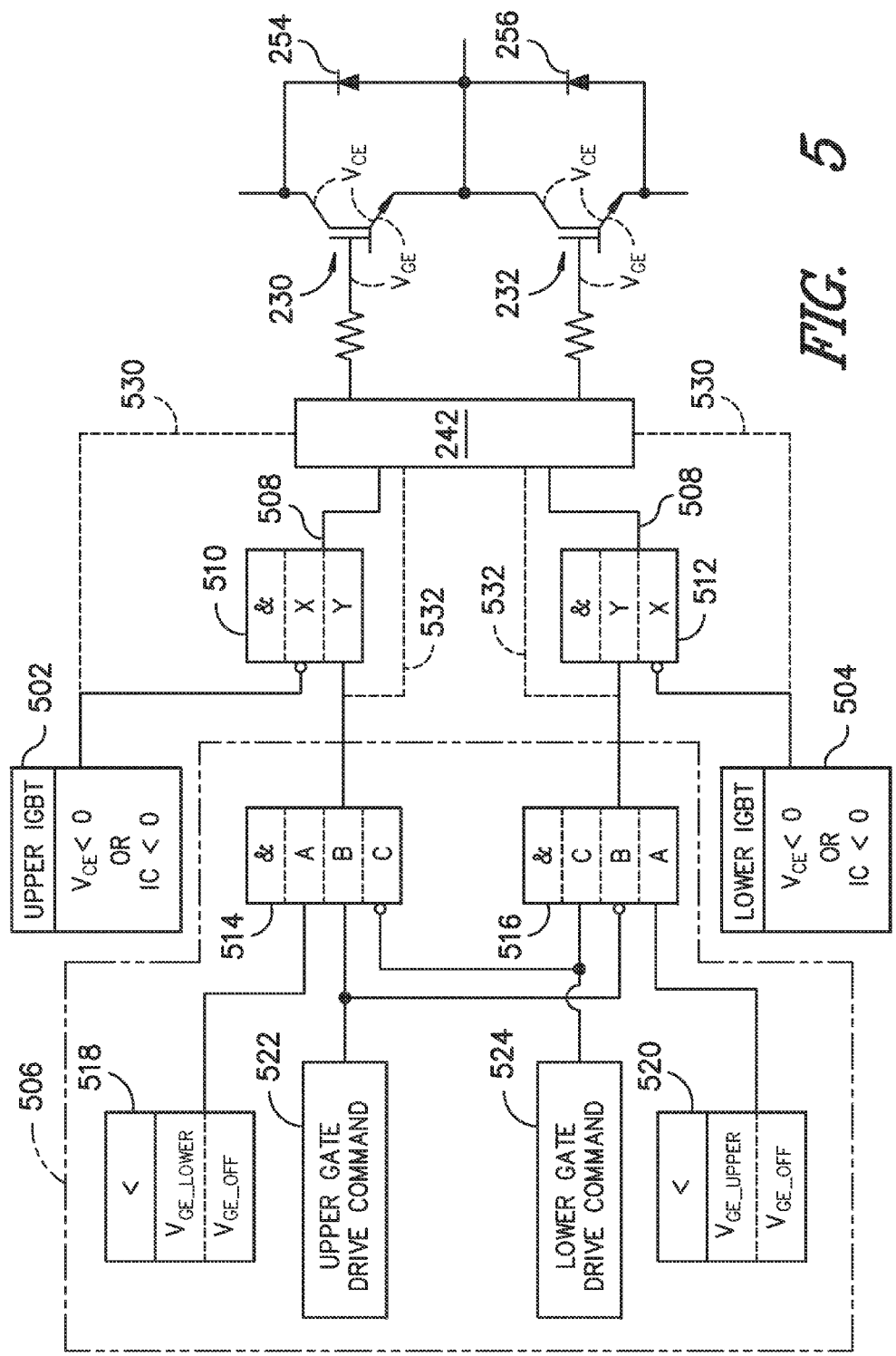
FIG. 5 illustrates a schematic view of one embodiment of a control diagram for controlling the operation of switching elements of a single-phase bridge circuit in accordance with aspects of the present subject matter.

Referring now to FIG. 5, one embodiment of a control diagram for controlling the operation of the IGBTs 230, 232 of a single-phase bridge circuit is illustrated in accordance with aspects of the present subject matter. As will be described below, activation and deactivation of the IGBTs 230, 2302 may be controlled by implementing a first gate control feature (indicated by boxes 502 and 504) and/or a second gate control feature (indicated by box 506 shown in phantom lines). For instance, in several embodiments, a gating command signal 508 may be configured to be transmitted to the driver circuit 242 for activating the upper IGBT 230 or the lower IGBT 232 when two predetermined input conditions are satisfied ((i.e., conditions X and Y from box 510 when activating the upper IGBT 230 and conditions X and Y from box 512 when activating the lower IGBT 232). In such embodiments, the first input condition (i.e., condition X) is associated with the first gate control feature 502, 504 and the second input condition (i.e., condition Y) is associated with the second gate control feature 506.

In general, the first gate control feature 502, 504 may be configured to serve as an individualized control feature for the IGBTs 230, 232 by assessing the particular operating state of each IGBT 230, 232. Specifically, to provide a suitable input signal for satisfying the first input condition (i.e., condition X of box 510 or 512) for activating one of the IGBTs 230, 232, the first gate control feature 502, 504 determines whether current is flowing into each IGBT 230, 232 or its corresponding anti-parallel diode 254, 256. If current is flowing into the anti-parallel diode 254, 256, then the IGBT 230, 232 associated with such diode 254, 256 should be turned off or otherwise maintained in the deactivated state (e.g., by transmitting a high signal from box 502 or 504 that is inverted to a low signal at box 510 or 512). Alternatively, if current is flowing into one of the IGBTs 230, 232, then such IGBT 230, 232 should be turned on or otherwise switched to the activated state (e.g., by transmitting a low signal from box 502 or 504 that is inverted at box 510 or 512).

As shown in FIG. 5, in several embodiments, the first gate control feature 502, 504 may be configured to determine whether current is flowing into one of the IGBTs 230, 232 or its corresponding anti-parallel diode 254, 256 based on detection of the collector-emitter voltage ($V_{CE}$) for each IGBT 230, 232 and/or detection of the direction of the current (IC) through each IGBT 230, 232. In such embodiments, the upper IGBT 230 or lower IGBT 232 may be commanded to be deactivated when either the collector-emitter voltage ($V_{CE}$) for such IGBT 230, 232 is negative or the current through such IGBT 230, 232 is negative (i.e., a current direction into the anti-parallel diode 254, 256 as shown by arrow 260 in FIG. 4). In contrast, the upper IGBT 230 or lower IGBT 232 may be commanded to be activated when the collector-emitter voltage ($V_{CE}$) for such IGBT 230, 232 is positive and/or the current through such IGBT 230, 232 is positive (i.e., a current direction out of the anti-parallel diode 254, 256 as shown by arrow 262 in FIG. 4).

Referring still to FIG. 5, the second gate control feature 506 generally provides a means for controlling each IGBT 230, 232 within a single-phase bridge circuit based, at least in part, on the operating state or condition of the other IGBT 230, 232 within such bridge circuit. Specifically, to provide a suitable input signal for satisfying the second input condition (i.e., condition Y) for activating one of the IGBTs 230, 232, the second gate control feature 506 includes three separate input conditions that must be satisfied (i.e., conditions A, B and C from box 514 when activating the upper IGBT 230 and conditions A, B and C from box 516 when activating the lower IGBT 232).

To satisfy the first input condition associated with the second gate control feature 506 (i.e., condition A), the controller 174 is configured to verify that the gate voltage ($V_{GE\_UPPER}$ or $V_{GE\_LOWER}$) for the IGBT 230, 232 that has been (or is being) deactivated less than a predetermined voltage threshold ($V_{GE\_OFF}$). For instance, when the upper IGBT 230 is to be activated, the controller 174 verifies (at box 518) that the gate voltage for the lower IGBT 232 ($V_{GE\_LOWER}$) is less than the predetermined voltage threshold ($V_{GE\_OFF}$). Similarly, when the lower IGBT 232 is to be turned on, the controller 174 verifies (at box 520) that the gate voltage for the upper IGBT 230 ($V_{GE\_UPPER}$) is less than the predetermined voltage threshold ($V_{GE\_OFF}$).

It should be appreciated that predetermined voltage threshold ($V_{GE\_OFF}$) may, in several embodiments, correspond to a gate turn-on threshold for the IGBTs 230, 232 (i.e., the voltage across which an IGBT is activated or deactivated). In general, the gate turn-on threshold may be any suitable voltage threshold. For instance, in one embodiment, the gate turn-on threshold may range from about 5 volts to about 10 volts, such as from about 6 volts to about 9 volts or from about 7 volts to about 8 volts and any other subranges therebetween.

Referring still to FIG. 5, to satisfy the second and third input conditions associated with the second gate control feature 506 (i.e., conditions B and C of boxes 514, 516), the controller 174 is configured to verify whether suitable gate drive commands have been transmitted/received for activating and deactivating the IGBTs 230, 232. Specifically, when the upper IGBT 232 is to be turned on, the controller 174 verifies that the gate drive command for the upper IGBT (box 522) is associated with switching the upper IGBT 230 to the activated state (i.e., to satisfy condition B of box 514) and that the gate drive command for the lower IGBT (box 524) is associated with switching the lower IGBT 232 to the deactivated state (i.e., to satisfy condition C of box 514). Similarly, when the lower IGBT 232 is to be turned on, the controller 174 verifies that the gate drive command for the lower IGBT (box 514) is associated with switching the lower IGBT 232 to the activated state (i.e., to satisfy condition C of box 516) and that the gate drive command for the upper IGBT (box 522) is associated with switching the upper IGBT 230 to the deactivated state (i.e., to satisfy condition B of box 516).

Using the control logic shown in FIG. 5, the controller 174 may be configured to delay activation of a particular IGBT 230, 232 until both input conditions (i.e., conditions X and Y from box 510 or 512) are satisfied for such IGBT 230, 232. For instance, assuming that the lower IGBT 232 was previously activated and is currently being switched to the deactivated state, the controller 174 may be configured to delay activating the upper IGBT 230 until all three conditions associated with the second gate control feature 506 have been satisfied (i.e., conditions A, B and C from box 514) and it is verified that current is flowing into the upper IGBT 230. Upon such occurrence, the controller 174 may transmit a suitable gating command signal 508 to the driver circuit 242 to activate the upper IGBT 230 (e.g., by increasing the gate voltage of the upper IGBT 230 ($V_{UPPER}$) to a level above the gate turn-on threshold ($V_{GE\_OFF}$)).

It should be appreciated by those of ordinary skill in the art that, although the first and second gate control feature as shown in FIG. 5 as being implemented in combination, such control features may also be implemented separately. For instance, as will be described below, the first gate control feature 502, 504 may be implemented individually as a means for controlling the operation of the IGBTs 230, 232, with each IGBT 230, 232 being activated when current is flowing into the IGBT 230, 232 and deactivated when current is flowing into its corresponding anti-parallel diode 254, 256. In such instance, as shown by the dashed lines in FIG. 5, a suitable gating command signal 530 may be transmitted to the driver circuit 242 to activate or deactivate the IGBTs 230, 232 based on the detected current flow through the IGBTs 230, 232. Similarly, the second gate control feature 506 may also serve as a stand-alone control feature, with each IGBT 230, 232 being activated only when its corresponding input conditions (i.e., conditions A, B and C from box 514 or 516) are satisfied. For instance, as shown by the dashed lines 532 in FIG. 5, a suitable gating command signal 530 may be transmitted to the driver circuit 242 to activate or deactivate the IGBTs 230, 232 based on the required input conditions of the second gate control feature 506.

Figure 6:
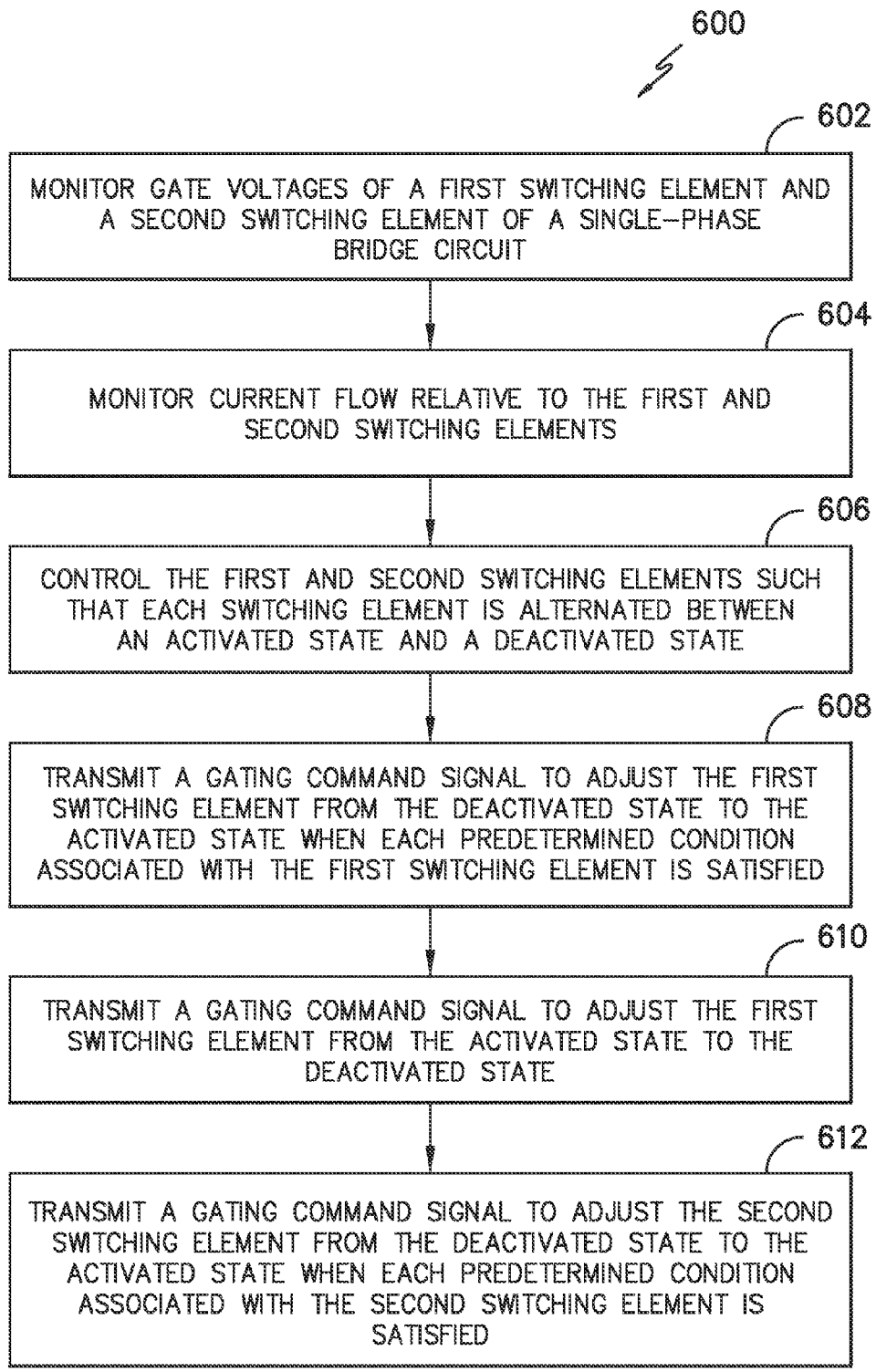
FIG. 6 illustrates a flow diagram of one embodiment of a method for controlling the operation of switching elements of a single-phase bridge circuit in accordance with aspects of the present subject matter.

Referring now to FIG. 6, a flow diagram of one embodiment of a method 600 for controlling the operation of switching elements contained within a single-phase bridge circuit of a power convertor is illustrated in accordance with aspects of the present subject matter. In general, the method 600 will be described herein as being implemented with reference to controlling the switching elements (i.e., IGBTs 230, 232) contained within the power convertor 162 of the system 100 described above with reference to FIGS. 2-4. However, it should be appreciated that the disclosed method 600 may be used to control the switching elements contained within the power convertor of any other suitable power generation system.

In addition, although FIG. 6 depicts method elements performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways. For example, the method 600 of FIG. 6 will be described with reference to the implementation of both the first and second gate control features. However, as will be described below with reference to FIGS. 7 and 8, embodiments of the methods disclosed herein may be implemented using either the first gate control feature 502, 504 or the second gate control feature 506 to control the operation of the switching elements.

As shown in FIG. 6, at (602), the method 600 includes monitoring the gate voltages of first and second switching elements of a single-phase bridge circuit (e.g., the upper and lower IGBTs 230, 232). It should be appreciated that the controller 174 may be configured to monitor the gate voltages of the switching elements using any suitable means known in the art. Specifically, in several embodiments, the controller 174 may be coupled to a voltmeter and/or ammeter configured to monitor the gate voltages.

Additionally, at (604), the method 600 includes monitoring the current flow relative to the first and second switching elements. Specifically, the current flow may be monitored to determine whether current is flowing into each switching element or its corresponding diode (e.g., anti-parallel diode 254, 256). As indicated above, such a determination may be made, for example, by monitoring the collector-emitter voltage for each switching element and/or the current direction through each switching element. For instance, if the collector-emitter voltage is negative and/or the current through the switching element is negative, it may be determined that current is flowing into the anti-parallel diode 254, 256. However, if the collector-emitter voltage is positive and/or the current through the switching element is positive, it may be determined that current is flowing into such switching element.

Moreover, at (606), the method 600 includes controlling the first and second switching elements so that each switching element is alternated between an activated state and a deactivated state. Specifically, as indicated above, the controller 174 is configured to alternately activate and deactivate the switching elements to ensure that only one of the switching elements is gated at a time. For example, assuming the second switching element is currently being switched from an activated state to a deactivated state, the controller 174 may be configured to activate the first switching element when it is verified that the second switching element is no longer gated.

Referring still to FIG. 6, at (608), the method 600 includes transmitting a gating command signal to adjust the first switching element from the deactivated state to the activated state when each predetermined condition associated with the first switching element is satisfied. For instance, assuming that both the first and second gate control features 502, 504, 506 described above with reference to FIG. 5 are being implemented, the controller 174 may be configured to transmit a gating command signal 502 to activate the first switching element when: the gate voltage of the second switching element is less than a predetermined voltage threshold (e.g., condition A of box 514 of FIG. 5); a gate drive command is received that is associated with switching the first switching element to the activated state (e.g., condition B of box 514 of FIG. 5); a second gate drive command is received that is associated with switching the second switching element to the deactivated state (e.g., condition C of box 514 of FIG. 5); and it is determined that current is flowing into the first switching element (box 502 of FIG. 5)

Additionally, at (610), the method 600 includes transmitting a gating command signal to adjust the first switching element from the activated state to the deactivated state. Thereafter, at (612), the controller 174 may be configured to transmit a gating command signal to adjust the second switching element from the deactivated state to the activated state when each predetermined condition associated with the second switching element is satisfied. For instance, as indicated above with reference to FIG. 5, a gating command signal 502 may be transmitted to activate the second switching element when: the gate voltage of the first switching element is less than a predetermined voltage threshold (e.g., condition A of box 516 of FIG. 5); a first gate drive command is received that is switching the first switching element to the deactivated state (e.g., condition B of box 516 of FIG. 5); a second gate drive command is received that is associated with switching the second switching element to the activated state (e.g., condition C of box 516 of FIG. 5); and it is determined that current is flowing into the second switching element (box 504 of FIG. 5).

Figure 7:
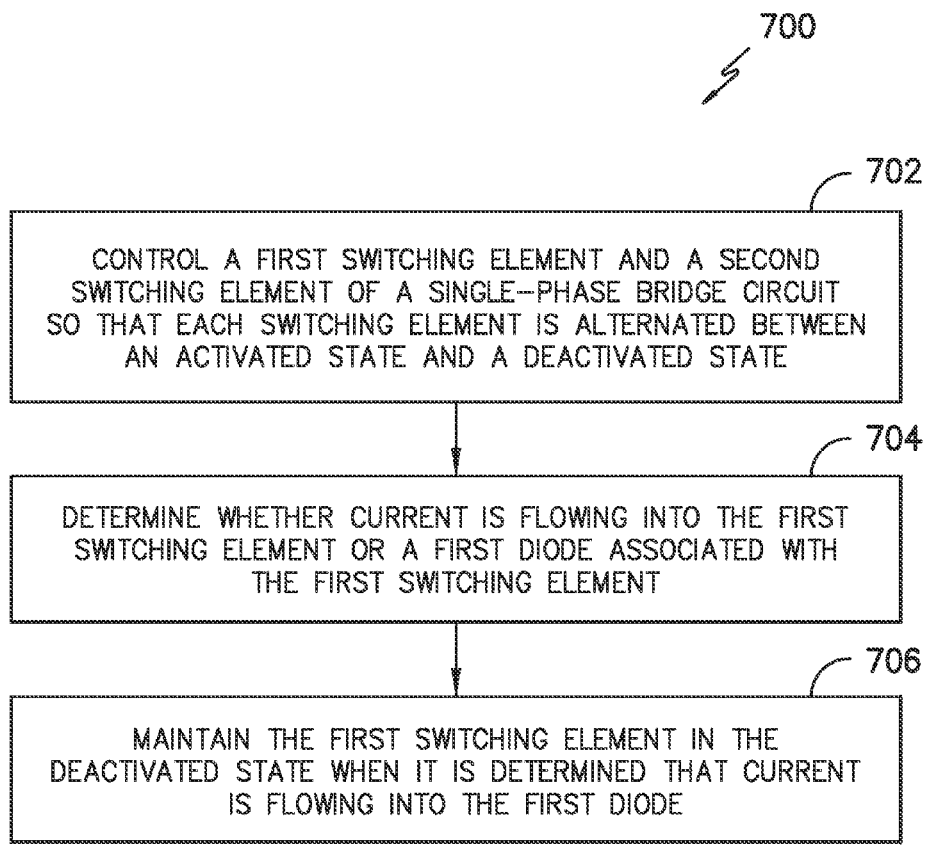
FIG. 7 illustrates a flow diagram of another embodiment of a method for controlling the operation of switching elements of a single-phase bridge circuit in accordance with aspects of the present subject matter.

Referring now to FIG. 7, a flow diagram of another embodiment of a method 700 for controlling the operation of switching elements contained within a single-phase bridge circuit of a power convertor is illustrated in accordance with aspects of the present subject matter. In general, the method 700 will be described as being implemented with reference to controlling the switching elements (e.g., IGBTs 230, 232) contained within the power convertor 162 of the system 100 described above with reference to FIGS. 2-4 using the first gate control feature 502, 504 of FIG. 5. However, it should be appreciated that the disclosed method 700 may be used to control the switching elements contained within the power convertor of any other suitable power generation system. In addition, although FIG. 7 depicts method elements performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIG. 7, at (702), the method 700 includes controlling first and second switching elements of a single-phase bridge circuit (e.g., the upper and lower IGBTs 230, 232) so that each switching element is alternated between an activated state and a deactivated state. Specifically, as indicated above, the controller 174 may be configured to alternately activate and deactivate the switching elements to ensure that only one of the switching elements is gated at a time. For example, assuming the second switching element is currently being switched from an activated state to a deactivated state, the controller 174 may be configured to activate the first switching element when it is verified that the second switching element is no longer gated.

At (704), the method 700 includes determining whether current is flowing into the first switching element or a first diode (e.g. anti-parallel diode 254, 256) associated with the first switching element. As indicated above, such a determination may be made, for example, by monitoring the collector-emitter voltage for the first switching element and/or the current direction through first switching element.

Additionally, at (706), the method 700 includes maintaining the first switching element in the deactivated state when it is determined that current is flowing into the first diode. For instance, if the collector-emitter voltage and/or the current direction is/are negative, the first switching element may be maintained in the deactivated state. Thereafter, if it is determined that the collector-emitter voltage and/or current direction is no longer negative, the first switching element may then be switched to the activated state.

It should be appreciated that a similar methodology may also be utilized control activation/deactivation of the second switching element of the single-phase bridge circuit. Specifically, a determination may be made as to whether current is flowing into the second switching element or a second diode (e.g. anti-parallel diode 254, 256) associated with the second switching element. If current is flowing into the second diode, the second switching element may be maintained in the deactivated state.

Figure 8:
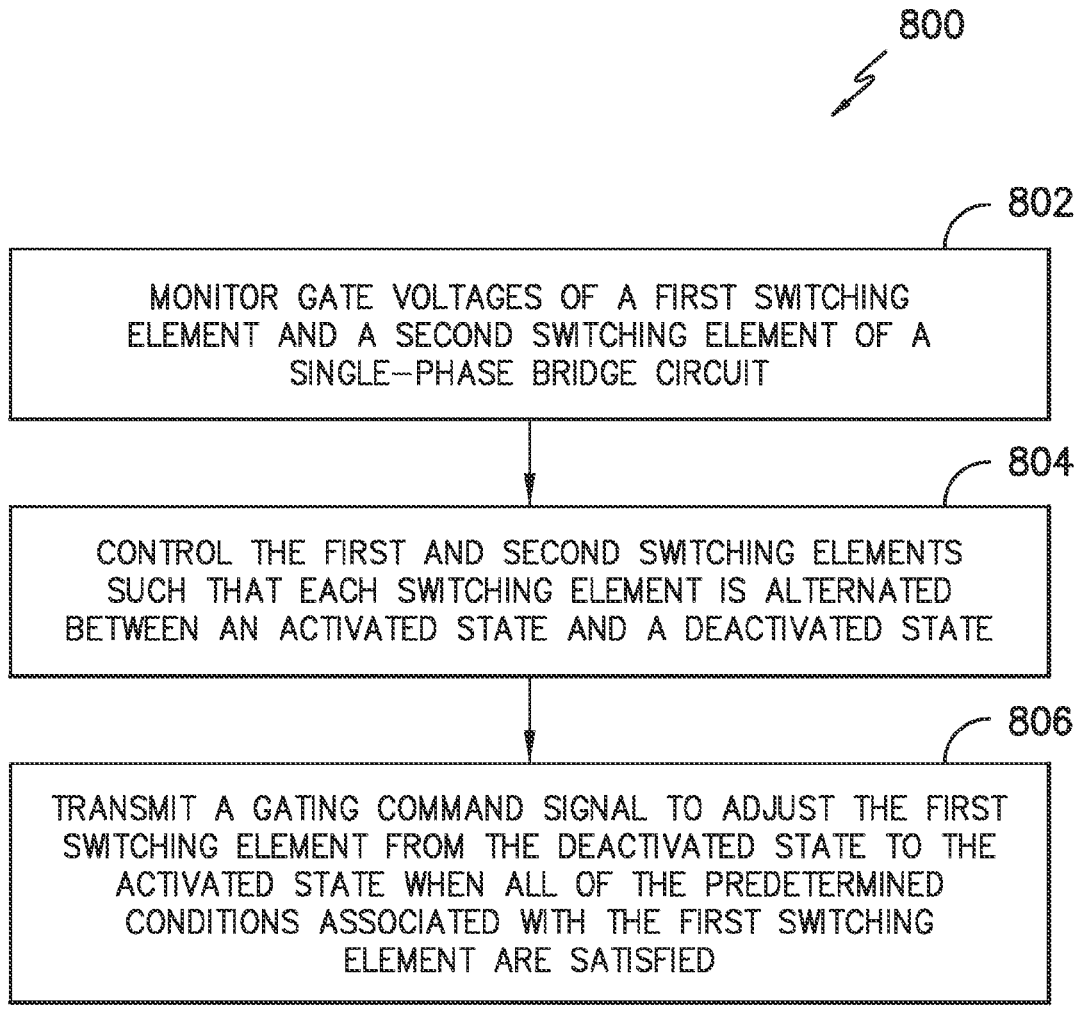
FIG. 8 illustrates a flow diagram of one embodiment of a method for controlling the operation of switching elements of a single-phase bridge circuit in accordance with aspects of the present subject matter.

Referring now to FIG. 8, a flow diagram of a further embodiment of a method 800 for controlling the operation of switching elements contained within a single-phase bridge circuit of a power convertor is illustrated in accordance with aspects of the present subject matter. In general, the method 800 will be described herein as being implemented with reference to controlling the switching elements (e.g., IGBTs 230, 232) contained within the power convertor 162 of the system 100 described above with reference to FIGS. 2-4 using the second gate control feature 506 of FIG. 5. However, it should be appreciated that the disclosed method 800 may be used to control the switching elements contained within the power convertor of any other suitable power generation system. In addition, although FIG. 8 depicts method elements performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIG. 8, at (802), the method 800 includes monitoring the gate voltages of first and second switching elements of a single-phase bridge circuit (e.g., the upper and lower IGBTs 230, 232). In addition, at (804), the method 800 includes controlling the first and second switching elements so that each switching element is alternated between an activated state and a deactivated state. Specifically, as indicated above, the controller 174 is configured to alternately activate and deactivate the switching elements to ensure that only one of the switching elements is gated at a time.

Moreover, at (806), the method 800 includes transmitting a gating command signal to adjust the first switching element from the deactivated state to the activated state when each predetermined condition associated with the first switching element is satisfied for the first gate control feature 506. For instance, as indicated above, the controller 174 may be configured to transmit a gating command signal 532 to activate the first switching element when: the gate voltage of the second switching element is less than a predetermined voltage threshold (e.g., condition A of box 514 of FIG. 5); a gate drive command is received that is associated with switching the first switching element to the activated state (e.g., condition B of box 514 of FIG. 5); and a second gate drive command is received that is associated with switching the second switching element to the deactivated state (e.g., condition C of box 514 of FIG. 5).

It should be appreciated that a similar methodology may also be utilized control activation/deactivation of the second switching element of the single-phase bridge circuit. Specifically, if each input condition for the second switching element is satisfied (e.g., conditions A, B and C of box 516), a suitable gating command signal 532 may be transmitted to the driver circuit 242 to activate the second switching element.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an operation of switching elements contained within a single-phase bridge circuit of a power convertor, the method comprising:
   monitoring, with a computing device, gate voltages of a first switching element and a second switching element of the single-phase bridge circuit;
   controlling the first and second switching elements so that each switching element is alternated between an activated state and a deactivated state;
   transmitting a gating command signal to adjust the first switching element from the deactivated state to the activated state in response to:
      a first gate drive command being received that is associated with switching the first switching element to the activated state;
      a second gate drive command being received that is associated with switching the second switching element to the deactivated state;
      a first indication being received that the gate voltage of the second switching element is less than a predetermined voltage threshold; and
      a second indication being received that current is not flowing through a first anti-parallel diode associated with the first switching element;
   transmitting a second gating command signal to adjust the first switching element from the activated state to the deactivated state; and
   transmitting a third gating command signal to adjust the second switching element from the deactivated state to the activated state in response to:
      a third gate drive command being received that is associated with switching the second switching element to the activated state;
      a fourth gate drive command being received that is associated with switching the first switching element to the deactivated state;
      a third indication being received that the gate voltage of the first switching element is less than the predetermined voltage threshold; and
      a fourth indication being received that current is not flowing through a second anti-parallel diode associated with the second switching element.

2. The method of claim 1, wherein the first and second switching elements comprise insulated gate bipolar transistors.

3. The method of claim 1, wherein the predetermined voltage threshold corresponds to a gate turn-on voltage for the first and second switching elements.

4. The method of claim 1, further comprising determining whether the current is flowing into or out of the first anti-parallel diode associated with the first switching element.

5. A wind turbine system for supplying power for application to a load, the wind turbine system comprising:
   a wind turbine rotor, the wind turbine rotor including a hub and a plurality of rotor blades coupled to the hub;
   a generator coupled to the wind turbine rotor;
   a power converter coupled to the generator, the power converter including a single-phase bridge circuit having a first switching element and a second switching element; and
   a controller communicatively coupled to the power converter, the controller being configured to:
      monitor gate voltages of a first switching element and a second switching element of the single-phase bridge circuit;
      control the first and second switching elements so that each switching element is alternated between an activated state and a deactivated state;
      transmit a gating command signal to adjust the first switching element from the deactivated state to the activated state in response to:
         a first gate drive command being received that is associated with switching the first switching element to the activated state;
         a second gate drive command being received that is associated with switching the second switching element to the deactivated state;
         a first indication that the gate voltage of the second switching element is less than a predetermined voltage threshold; and
         a second indication being received that current is not flowing through a first anti-parallel diode associated with the first switching element;
      transmit a second gating command signal to adjust the first switching element from the activated state to the deactivated state; and
      transmit a third gating command signal to adjust the second switching element from the deactivated state to the activated state in response to:
         a third gate drive command being received that is associated with switching the second switching element to the activated state;
         a fourth gate drive command being received that is associated with switching the first switching element to the deactivated state;
         a third indication being received that the gate voltage of the first switching element is less than the predetermined voltage threshold; and
         a fourth indication being received that current is not flowing through a second anti-parallel diode associated with the second switching element.

6. The system of claim 5, wherein the generator is a doubly-fed induction generator.

7. The system of claim 5, wherein the first and second switching elements comprise insulated gate bipolar transistors.

8. The system of claim 5, wherein the predetermined voltage threshold corresponds to a gate turn-on voltage for the first and second switching elements.

9. The system of claim 5, wherein the controller is further configured to determine whether the current is flowing into or out of the first anti-parallel diode associated with the first switching element.

* * * * *